(12) United States Patent
Shen et al.

(10) Patent No.: US 10,161,528 B2
(45) Date of Patent: Dec. 25, 2018

(54) VALVE PLUGS HAVING CURVED NOTCHES

(71) Applicant: FISHER CONTROLS INTERNATIONAL LLC, Marshalltown, IA (US)

(72) Inventors: Yanning Shen, Tianjin (CN); Julian Adin Mann, III, Ames, IA (US)

(73) Assignee: Fisher Controls International LLC, Marshalltown, IA (US)

(*) Notice: Subject to any disclaimer, the term of this patent is extended or adjusted under 35 U.S.C. 154(b) by 45 days.

(21) Appl. No.: 15/184,618

(22) Filed: Jun. 16, 2016

(65) Prior Publication Data

US 2017/0350513 A1    Dec. 7, 2017

(30) Foreign Application Priority Data

Jun. 6, 2016  (CN) .......................... 2016 1 0393198

(51) Int. Cl.
*F16K 1/06* (2006.01)
*F16K 1/12* (2006.01)
(Continued)

(52) U.S. Cl.
CPC ................. *F16K 1/38* (2013.01); *F16K 1/06* (2013.01); *F16K 1/12* (2013.01); *F16K 1/385* (2013.01);
(Continued)

(58) Field of Classification Search
CPC ..... F16K 1/04; F16K 1/06; F16K 1/08; F16K 1/10; F16K 1/12; F16K 1/38; F16K 1/385; F16K 5/02; F16K 5/0214; F16K 5/0235; F16K 3/22; F16K 3/24; Y10T 137/206; Y10T 137/2087; Y10T 137/2093;
(Continued)

(56) References Cited

U.S. PATENT DOCUMENTS 1,510,528 A * 10/1924 Sebenste .................. F16K 1/38
251/266
1,597,627 A * 8/1926 Sellinger ................ F16K 1/385
251/219
(Continued)

FOREIGN PATENT DOCUMENTS

| DE | 1086095 B * | 7/1960 | ............... F16K 1/04 |
| DE | 2133422 A1 * | 1/1972 | ............. F16K 47/04 |
| WO | WO 9803812 A1 * | 1/1998 | ........... B67D 1/1461 |

OTHER PUBLICATIONS

Flowserve Corporation, Valtek Mark One for Power Services, 1994, 16 pages.
(Continued)

*Primary Examiner* — Reinaldo Sanchez-Medina
*Assistant Examiner* — Hailey K Do
(74) *Attorney, Agent, or Firm* — Hanley Flight & Zimmerman, LLC

(57) ABSTRACT

Valve plugs having curved notches are described herein. An example valve plug includes a first section defining a first end, a second section defining a second end opposite the first end, and a third section located between the first and second sections, the third section including a curved notch formed inwardly from a periphery of the third section toward a longitudinal axis of the valve plug defined by the first, second and third sections.

22 Claims, 10 Drawing Sheets

(51) Int. Cl.
*F16K 1/38* (2006.01)
*F16K 3/22* (2006.01)
*F16K 1/42* (2006.01)
*F16K 1/54* (2006.01)

(52) U.S. Cl.
CPC ............. *F16K 1/427* (2013.01); *F16K 1/54* (2013.01); *F16K 3/22* (2013.01); *Y10T 137/86718* (2015.04); *Y10T 137/86751* (2015.04); *Y10T 137/86767* (2015.04); *Y10T 137/87265* (2015.04)

(58) Field of Classification Search
CPC ......... Y10T 137/2104; Y10T 137/2109; Y10T 137/7839; Y10T 137/8571; Y10T 137/86767; Y10T 137/86783; Y10T 137/86718; Y10T 137/86751; Y10T 137/86759; Y10T 137/87265
See application file for complete search history.

(56) References Cited

U.S. PATENT DOCUMENTS

| | | | | |
|---|---|---|---|---|
| 1,772,406 A * | 8/1930 | Whiton | .................. | G05D 16/10 137/505.18 |
| 1,830,132 A * | 11/1931 | Quinn | .................. | F16K 1/02 137/625.33 |
| 1,919,232 A * | 7/1933 | Lee | .................. | F16K 25/04 251/122 |
| 1,998,241 A * | 4/1935 | Keen | .................. | F16K 1/44 137/625.34 |
| 3,317,184 A * | 5/1967 | Ursy | .................. | F16K 1/38 239/552 |
| 3,527,246 A * | 9/1970 | Petersen | .................. | F16K 1/38 137/512.2 |
| 3,791,413 A * | 2/1974 | Muller | .................. | F16K 47/04 137/625.3 |
| 4,383,553 A * | 5/1983 | Platt | .................. | F16K 25/04 137/625.4 |
| 6,076,552 A * | 6/2000 | Takahashi | .................. | F15B 13/0402 137/625.3 |
| 6,397,890 B1 * | 6/2002 | Mickelson | .................. | F15B 13/0402 137/625.34 |
| 6,450,194 B1 * | 9/2002 | Wasson | .................. | F15B 13/0402 137/351 |
| 7,959,127 B2 * | 6/2011 | Newton | .................. | F16K 1/12 137/625.37 |
| 8,038,121 B2 * | 10/2011 | Gessaman | .................. | F16K 1/38 251/122 |
| 9,759,347 B2 * | 9/2017 | Elliott | .................. | F16K 47/08 |
| 2003/0111119 A1 * | 6/2003 | Baumann | .................. | F16K 39/022 137/625.3 |

OTHER PUBLICATIONS

Flowserve Corporation, Valtek Mark One Control Valves, Irving, Texas, US, 2009, 20 pages.

Flowserve Corporation, Valtek Mark One Control Valves, Irving, Texas, US, 2015, 20 pages.

* cited by examiner

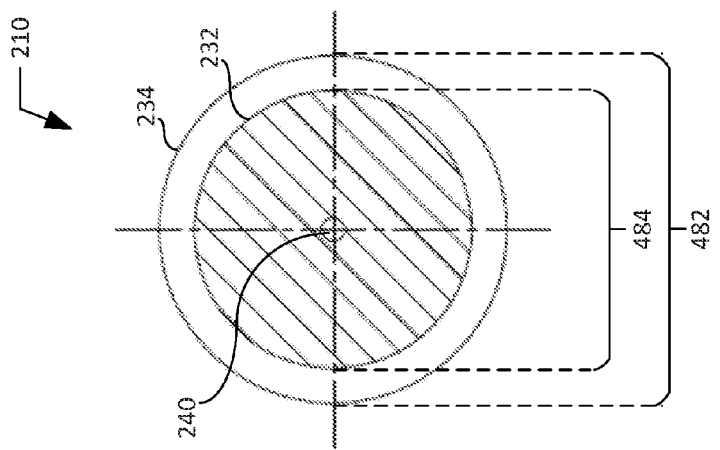
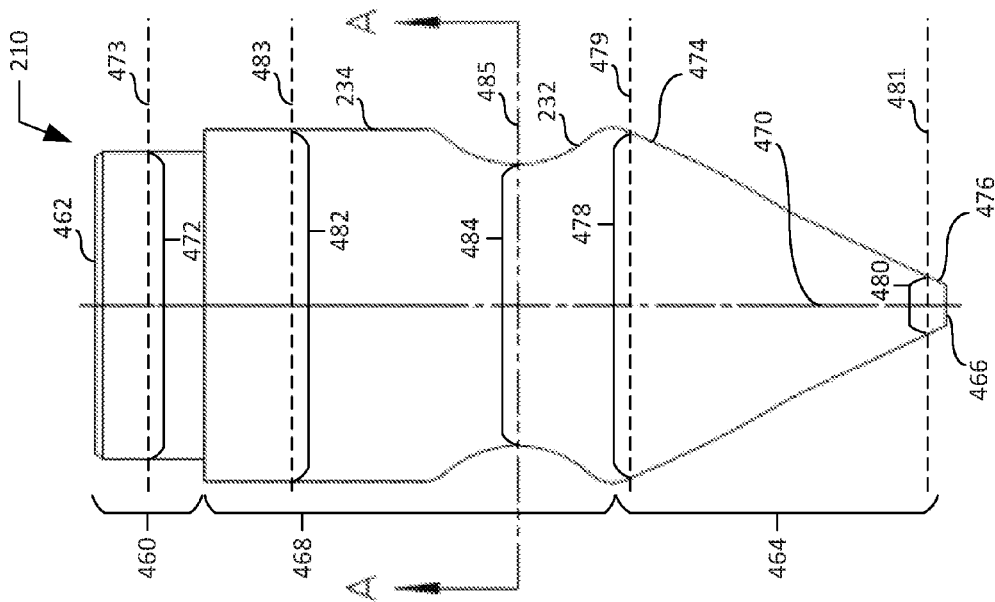
FIG. 5
FIG. 4

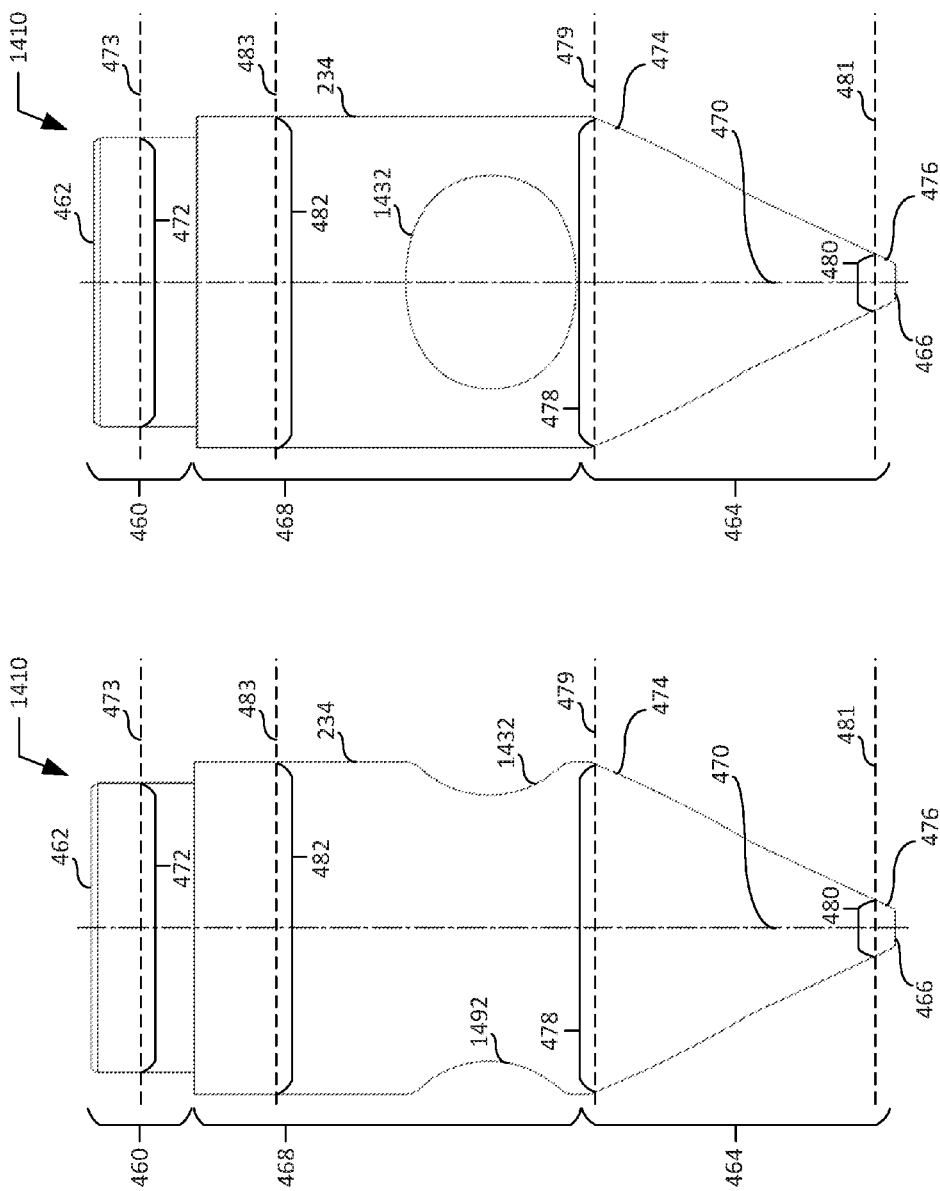

__

VALVE PLUGS HAVING CURVED NOTCHES

RELATED APPLICATIONS

This patent claims priority to Chinese Patent Application No. 201610393198.3, filed Jun. 6, 2016, entitled "Valve Plugs Having Curved Notches," the entirety of which is hereby incorporated herein by reference.

FIELD OF THE DISCLOSURE

This disclosure relates generally to valve plugs and, more particularly, to valve plugs having curved notches.

BACKGROUND

Certain valve applications may require that the valve provide for a choked fluid flow that causes fluid to pass through the throat of the valve at sonic speed. Current valve plugs do not include structures to adequately facilitate such choked fluid flow and/or supersonic flow rates in a manner that is distributed about the valve plug. For example, current valve plugs do not include structures that cause a fluid flowing toward the valve plug to be distributed around the valve plug and smoothly guided into an outlet port of the valve.

SUMMARY

An example valve plug includes a first section defining a first end, a second section defining a second end opposite the first end, and a third section located between the first and second sections, the third section including a curved notch formed inwardly from a periphery of the third section toward a longitudinal axis of the valve plug defined by the first, second and third sections.

BRIEF DESCRIPTION OF THE DRAWINGS

FIG. 4 is a side view of the first example valve plug shown in FIGS. 2 and 3.

FIG. 5 is a cross-sectional view of the first example valve plug of FIGS. 2-4 taken along line A-A of FIG. 4.

FIG. 14 is a side view of a sixth example valve plug having seventh and eighth example curved notches.

FIG. 15 is another side view of the sixth example valve plug of FIG. 14, rotated approximately ninety degrees relative to the side view of FIG. 14.

Figure 1:
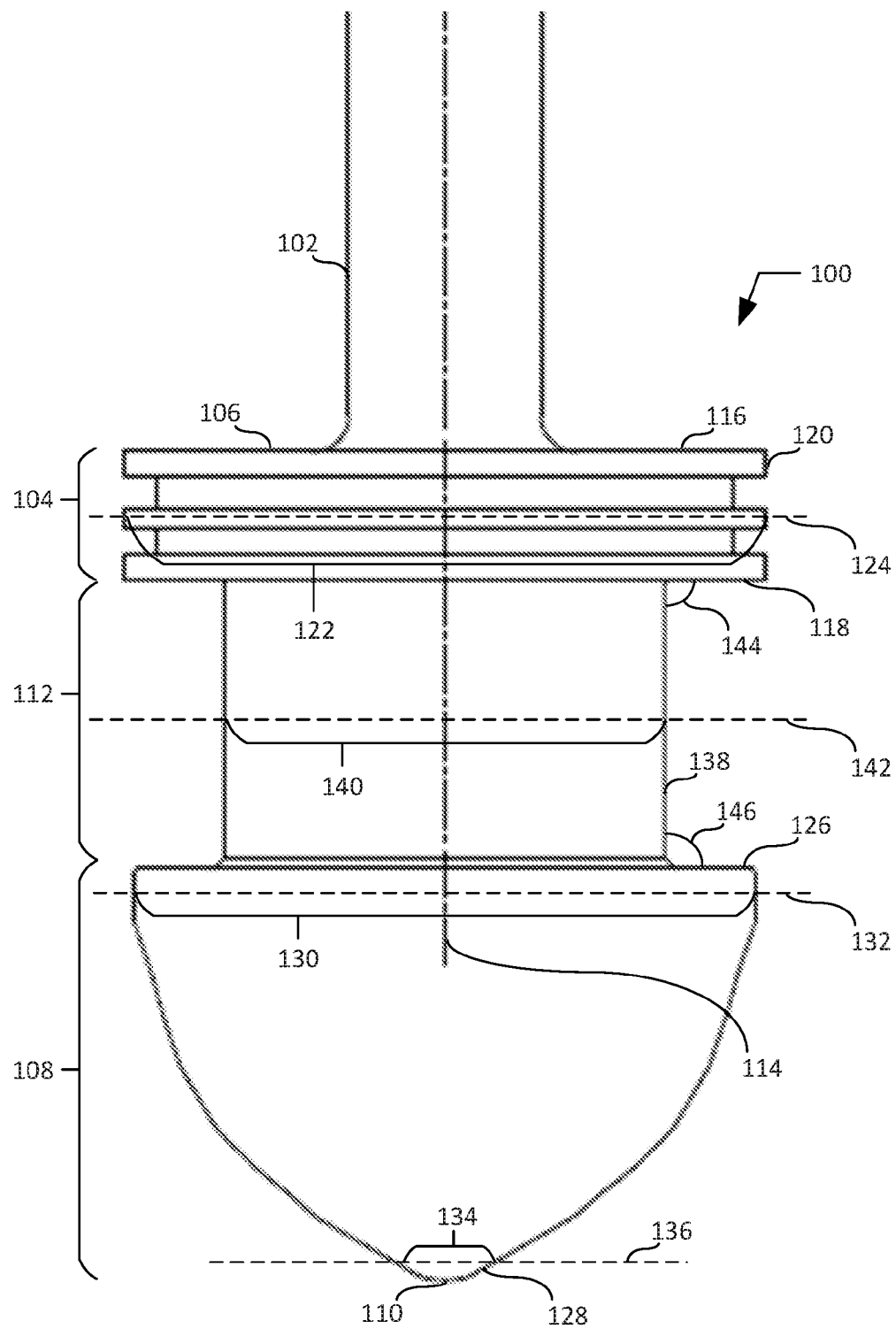
FIG. 1 is a side view of a known valve plug.

Certain examples are shown in the above-identified figures and described in detail below. In describing the examples of FIGS. 2-17, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Unlike conventional valve plugs that do not include structures capable of causing a fluid flowing toward the valve plug to be distributed around the valve plug and smoothly guided into an outlet port of the valve, the example valve plugs described herein include curved notches. Each example valve plug disclosed herein includes a curved notch that provides for an enlarged cavity between the valve plug and a backside inner wall surface of the valve body. The presence of the enlarged cavity resulting from the curved notch improves the flow distribution of a fluid flowing toward the valve plug and into an outlet port of the valve. For example, the presence of the enlarged cavity advantageously provides for a greater capacity of fluid to pass to the backside inner wall surface of the valve body in comparison to the capacity of fluid that might otherwise pass to the backside inner wall surface in the absence of the enlarged cavity. Such increased capacity advantageously provides for an increase in the flow rate of a fluid passing proximate the backside inner wall surface of the valve body. In some examples, such increased capacity and/or increased flow rate advantageously provides for a sonic fluid flow proximate the throat of the valve at the backside inner wall surface of the valve body, and/or otherwise provides for choked flow within and/or improved choking performance of the valve. In addition, the curved profile of each curved notch disclosed herein advantageously guides fluid flowing toward the valve plug and into the outlet port in a manner that is smoother, less turbulent and/or less stressful in comparison to the manner in which such fluid might otherwise be guided in the absence of the curved notch.

In some disclosed examples, the valve plug includes a first section defining a first end, a second section defining a second end opposite the first end, and a third section located between the first and second sections, the third section including a curved notch formed inwardly from a periphery of the third section toward a longitudinal axis of the valve plug defined by the first, second and third sections. In some disclosed examples, the curved notch extends completely about the periphery of the third section. In some disclosed examples, the curved notch extends about a portion of the periphery of the third section.

In some disclosed examples, the curved notch is a first curved notch, and the valve plug further includes a second curved notch formed inwardly from the periphery of the third section toward the longitudinal axis. In some disclosed examples, the first and second curved notches are spaced apart from one another about the periphery of the third section. In some disclosed examples, the first and second curved notches are shaped differently relative to one another.

In some disclosed examples, the curved notch is arc shaped. In some disclosed examples, the curved notch has a cross-section or profile formed by an inclined line and an arc, the inclined line being formed inwardly from the periphery of the third section toward the longitudinal axis, the arc being curved inwardly from the periphery of the third section toward the longitudinal axis.

In some disclosed examples, the first section of the valve plug has a generally cylindrical shape along the longitudinal axis of the valve plug, the second section of the valve plug has a generally conical shape along the longitudinal axis valve plug, and the periphery of the third section of the valve plug has a generally cylindrical shape along the longitudinal axis of the valve plug. In some examples, the valve plug includes a first circumference defined by the first section, a second circumference defined by a base portion of the second section, a third circumference defined by a tip portion of the second section, a fourth circumference defined by the periphery of the third section, and a fifth circumference defined in part by the curved notch. In some disclosed examples, the first circumference is less than the second circumference. In some disclosed examples, the first circumference is less than the fourth circumference. In some disclosed examples, the second circumference is greater than the third circumference and approximately equal to the fourth circumference. In some disclosed examples, the fifth circumference is less than the fourth circumference and greater than the third circumference.

Before describing the details of an example valve having an example improved valve plug, a description of a known valve plug is provided in connection with FIG. 1. FIG. 1 is a side view of a known valve plug 100. The plug 100 is rigidly coupled to a valve stem 102, Movement of the valve stem 102 determines the position of the plug 100 within a valve (not shown). The plug 100 includes a first section 104 that defines a first end 106 of the plug 100, a second section 108 that defines a second end 110 of the plug 100 opposite the first end 106, and a third section 112 located between the first and second sections 104, 108. The first, second and third sections 104, 108, 112 define a longitudinal axis 114 of the plug 100. Each of the first, second and third sections 104, 108, 112 of the plug 100 has a generally circular cross-sectional shape along a plane that is perpendicular to the longitudinal axis 114 of the plug 100.

As shown in FIG. 1, the first section 104 of the plug 100 has a generally cylindrical shape, including a top surface 116, a bottom surface 118 and a side surface 120. The side surface 120 of the first section 104 defines a first circumference 122 along a first plane 124 that is perpendicular to the longitudinal axis 114 of the plug 100. The second section 108 of the plug 100 has a generally conical shape, including a base portion 126 and a tip portion 128. The base potion 126 of the second section 108 defines a second circumference 130 along a second plane 132 that is perpendicular to the longitudinal axis 114 of the plug 100. The second circumference 130 is approximately equal to the first circumference 122. The tip portion 128 of the second section 108 defines a third circumference 134 along a third plane 136 that is perpendicular to the longitudinal axis 114 of the plug 100. The third circumference 134 is less than the second circumference 130. The third section 112 of the plug 100 has a generally cylindrical shape, including a side surface 138. The side surface 138 of the third section 112 defines a fourth circumference 140 along a fourth plane 142 that is perpendicular to the longitudinal axis 114 of the plug 100. The fourth circumference 140 is less than the first and second circumferences 122, 130, and is greater than the third circumference 134.

As shown in FIG. 1, the side surface 138 of the third section 112 of the plug 100 is parallel to the side surface 120 of the first section 104 of the plug 100. The side surface 138 of the third section 112 intersects the bottom surface 118 of the first section 104 at a first angle 144 of approximately ninety degrees, and similarly intersects the base portion 126 of the second section 108 of the plug 100 at a second angle 146 of approximately ninety degrees. In contrast to the known valve plug 100 of FIG. 1, the example valve plugs described herein include one or more curved notches formed inwardly from a periphery of the valve plug to cause a fluid flowing toward the valve plug to be distributed around the valve plug and smoothly guided into an outlet port of a valve.

Figure 2:
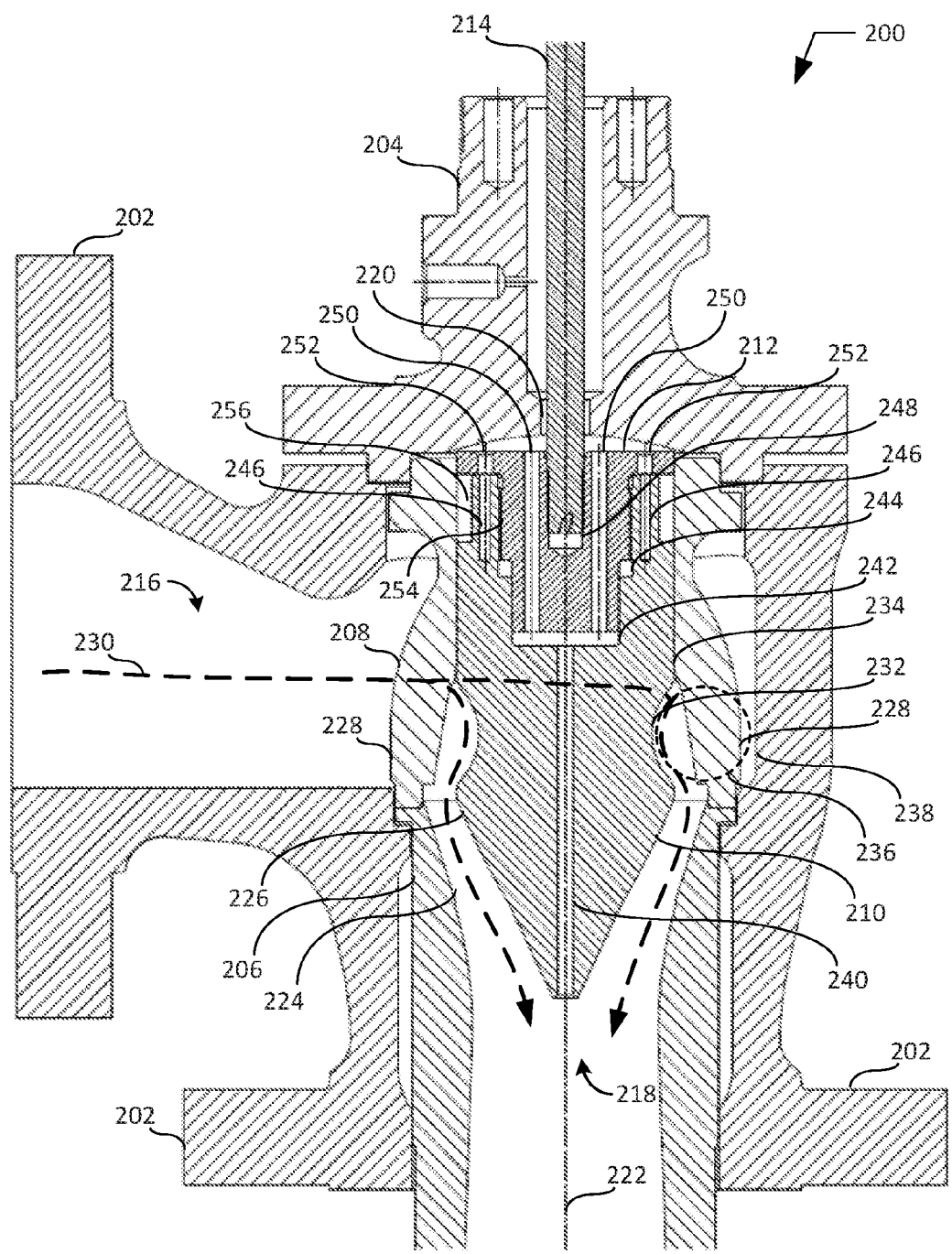
FIG. 2 is a cross-sectional view of an example valve including a first example valve plug having a first example curved notch. The example valve of FIG. 2 is in an open configuration.
Figure 3:
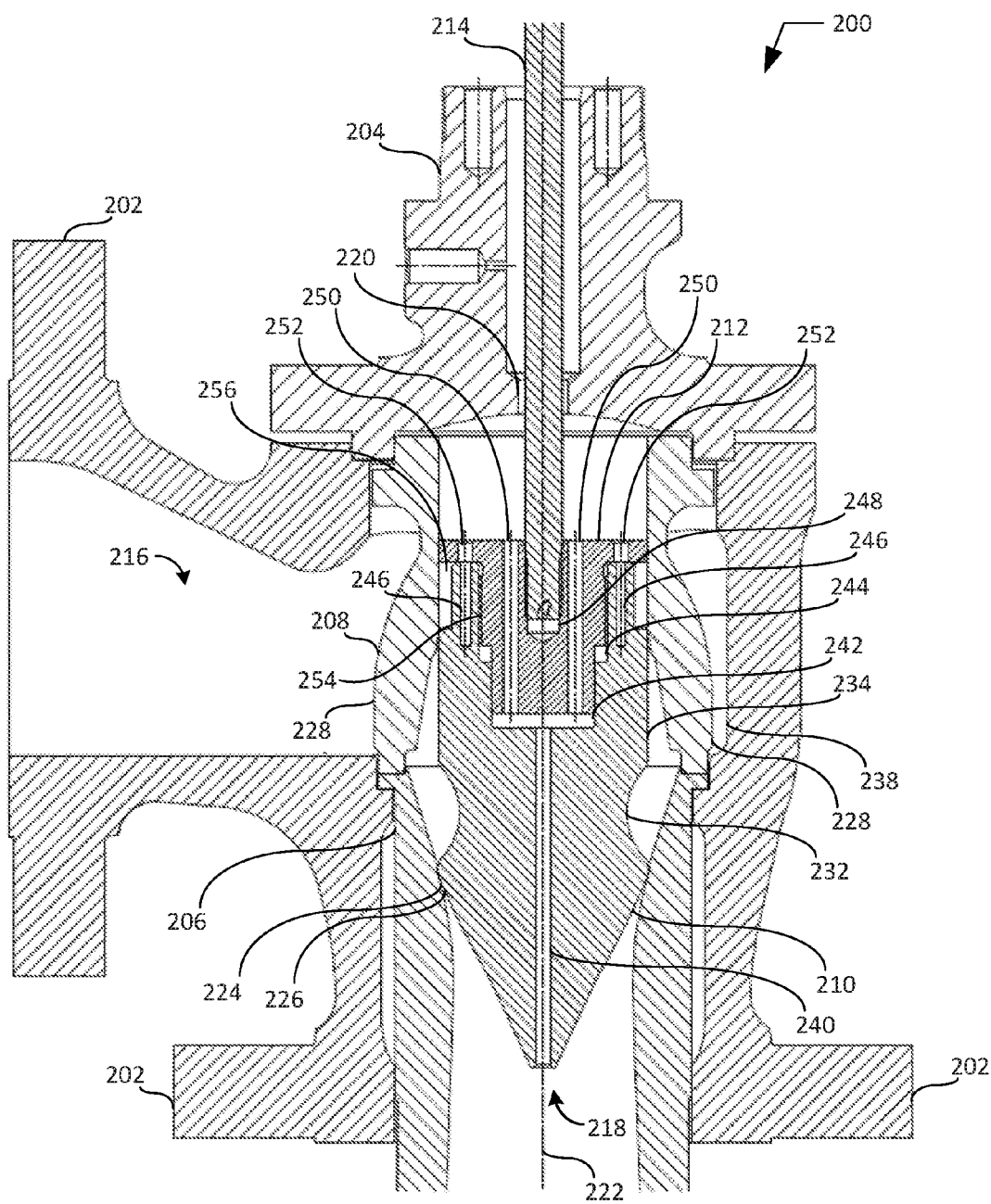
FIG. 3 is a cross-sectional view of the example valve of FIG. 2 in a closed configuration.
Figure 7:
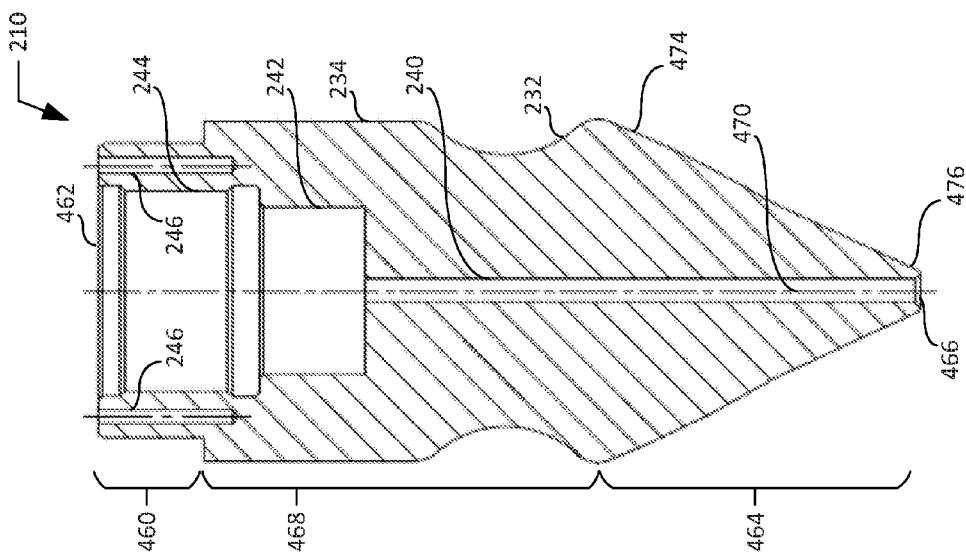
FIG. 7 is a cross-sectional view of the first example valve plug of FIGS. 2-6 taken along line B-B of FIG. 6.
Figure 6:
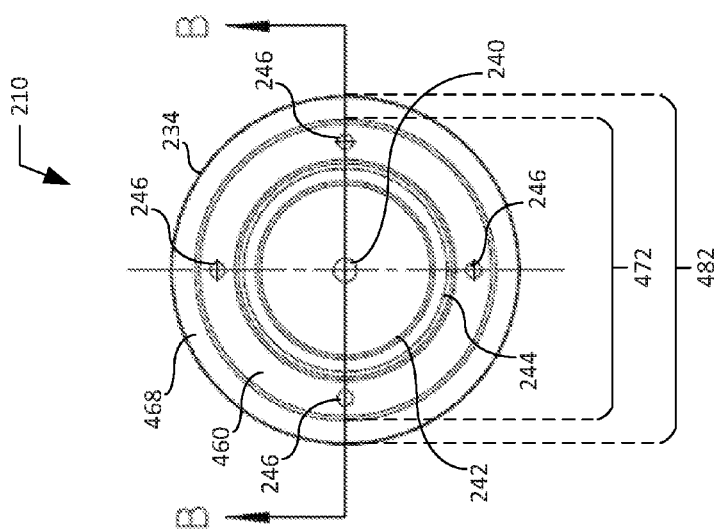
FIG. 6 is a plan view of the first example valve plug shown in FIGS. 2-5.

FIG. 2 is a cross-sectional view of an example valve 200 in an open configuration. FIG. 3 is a cross-section view of the example valve 200 of FIG. 2 in a closed configuration. The example valve 200 of FIGS. 2 and 3 includes an example body 202, an example bonnet 204, an example seat ring 206, an example seat ring retainer 208, an example plug 210, an example seal retainer 212, an example stem 214, an example inlet port 216, and an example outlet port 218. Although the valve 200 shown in FIGS. 2 and 3 is an angle valve, the valve 200 may alternatively take the form of another type of valve such as, for example, a globe valve. Although the valve 200 is shown in FIGS. 2 and 3 as containing the example plug 210 of FIGS. 2-7 described herein, the valve 200 may alternatively contain any one of the other example plugs of FIGS. 8-17 described herein.

In the illustrated example of FIGS. 2 and 3, the bonnet 204 is rigidly coupled via suitable fasteners (e.g., bolts or screws) to the body 202 of the valve 200 to define a volume of the valve 200 within which the seat ring 206, the seat ring retainer 208, the plug 210, the seal retainer 212, and a portion of the stem 214 are positioned. The bonnet 204 includes an example aperture 220 that receives a portion of the stem 214 of the valve 200 such that the stem 214 is capable of sliding and/or otherwise moving within the bonnet 204 and/or the body 202 of the valve 200 in a direction along an example longitudinal axis 222 of the valve 200.

The seat ring 206 is rigidly coupled (e.g., via a press fit or suitable fasteners) at a position within the body 202 of the valve 200 such that the plug 210 does not contact the seat ring 206 when the valve 200 is in an open configuration, as shown in FIG. 2. The seat ring 206 includes an example inner surface 224 that is configured to contact an example outer surface 226 of the plug 210 when the valve 200 is in a closed configuration, as shown in FIG. 3. In the illustrated example, the inner surface 224 of the seat ring 206 has a generally circular cross-sectional shape along a plane that is perpendicular to the longitudinal axis 222 of the valve 200. The inner surface 224 of the seat ring 206 may alternatively have other cross-sectional shapes and/or configurations including, for example, shapes resembling an oval, an ellipse, a triangle, a rectangle, a square, a rhombus, a pentagon, a hexagon, an octagon, or any other polygonal shape. In the illustrated example, the inner surface 224 of the seat ring 206 has a generally conical shape. The inner surface 224 of the seat ring 206 may alternatively take the form of other shapes and/or configurations including, for example, shapes resembling a cylinder, a pyramid, etc.

The seat ring retainer 208 is rigidly coupled (e.g., via a press fit or suitable fasteners) at a position within the body 202 of the valve 200 such that the seat ring retainer 208 inhibits and/or prevents the seat ring 206 from moving within the body 202. In the illustrated example, the seat ring retainer 208 is configured to include a plurality of legs 228 that are spaced apart around the plug 210 and within the body 202 of the valve 200 such that the seat ring retainer 208 does not close off and/or entirely prevent flow of a fluid from the inlet port 216 to the outlet port 218 when the valve 200 is in an open configuration, as shown in FIG. 2. Thus, when the valve 200 is in an open configuration, a fluid may flow from the inlet port 216 through the seat ring retainer 208 (e.g., via the spacing between the legs 228 of the seat ring retainer 208), through the seat ring 206, and toward the outlet port 218, as is generally shown by the illustrated example pathway 230 of FIG. 2. In other examples, the seat ring retainer 208 may be configured as a generally cylindrical body having apertures that enable a fluid to flow from the inlet port 216 through the seat ring retainer 208 (e.g., via the apertures of the seat ring retainer 208), through the seat ring 206, and toward the outlet port 218.

The plug 210 is rigidly coupled (e.g., via a threaded connection or suitable fasteners) to the seal retainer 212 of the valve 200. In the illustrated example, the plug 210 includes an example curved notch 232 formed inwardly from an example periphery 234 of the plug 210 toward the longitudinal axis 222 of the valve 200. As a result of the curved notch 232, an example enlarged cavity 236 (e.g., enlarged relative to a cavity that would exist in the absence of the curved notch 232) is formed between the plug 210 and an example backside inner wall surface 238 of the body 202 of the valve 200. The presence of the curved notch 232 improves the flow distribution of a fluid flowing from the inlet port 216 toward the plug 210, through the seat ring 206 and into the outlet port 218. For example, the presence of the curved notch 232 and/or the enlarged cavity 236 advantageously provides for a greater capacity of fluid to pass to the backside inner wall surface 238 of the body 202 of the valve 200 in comparison to the capacity of fluid that might otherwise pass to the backside inner wall surface 238 in the absence of the curved notch 232 and/or the enlarged cavity 236. Such increased capacity advantageously provides for an increase in the flow rate of a fluid passing proximate the backside inner wall surface 238 of the body 202 of the valve 200. In some examples, such increased capacity and/or increased flow rate advantageously provides for a sonic fluid flow proximate the throat of the valve at the backside inner wall surface 238 of the body 202 of the valve 200, and/or otherwise provides for choked flow within and/or improved choking performance of the valve 200. In addition, the curved profile of the curved notch 232 advantageously guides fluid flowing from the inlet port 216 toward the plug 210, through the seat ring 206 and into the outlet port 218 in a manner that is smoother and/or less turbulent in comparison to the manner in which such fluid right otherwise be guided in the absence of a notch such as the curved notch 232, and/or in the absence of a notch having the curved profile of the curved notch 232. The external shapes, configurations and features of the plug 210 and the curved notch 232 are described in greater detail below in connection with FIGS. 4-7.

In the illustrated example of FIGS. 2 and 3, the plug 210 further includes an example first central bore 240, an example second central bore 242, an example third central bore 244, and example first radial bores 246. Each of the first, second and third central bores 240, 242, 244 of the plug 210 is coaxially aligned with the longitudinal axis 222 of the valve 200. The first central bore 240 is in communication with the second central bore 242, which in turn is in communication with the third central bore 244. In the illustrated example, the first, second and third central bores 240, 242 and 244 collectively extend through the plug 210 in a direction along the longitudinal axis 222 of the valve 200. The second central bore 242 is wider than (e.g., has a larger diameter relative to) the first central bore 240, and the third central bore 244 is wider than (e.g., has a larger diameter relative to) the second central bore 242. When the plug 210 is rigidly coupled to the seal retainer 212, the first and second central bores 240, 242 are in fluid communication with the outlet port 218 of the valve 200. Thus, a fluid flowing within the body 202 of the valve 200 may pass from the outlet port 218 through the first central bore 240 of the plug 210, and into the second central bore 242 of the plug 210. The first radial bores 246 of the plug 210 are spaced about and parallel to the third central bore 244. In the illustrated example, the first radial bores 246 extend into, but not through, the plug 210.

The seal retainer of the valve 200 is received in the plug 210. More specifically, a portion of the seal retainer 212 is received in the second and third central bores 242, 244 of the plug 210. The seal retainer 212 includes an example fourth central bore 248, example second radial bores 250, example third radial bores 252, and an example threaded portion 254. The fourth central bore 248 of the seal retainer 212 is coaxially aligned with the longitudinal axis 222 of the valve 200. In the illustrated example, the fourth central bore 248 extends into, but not through, the seal retainer 212. The second radial bores 250 of the seal retainer 212 are spaced about and parallel to the fourth central bore 248. In the illustrated example, the second radial bores 250 extend through the seal retainer 212 in a direction along the longitudinal axis 222 of the valve 200. When the seal retainer 212 is rigidly coupled to the plug 210, the second radial bores 250 of the seal retainer 212 are in fluid communication with the second central bore 242 of the plug 210 which, as described above, is in fluid communication with the first central bore 240 of the plug 210 and the outlet port 218 of the valve 200. Thus, a fluid flowing within the body 202 of the valve 200 may pass from the outlet port 218 through the first central bore 240 of the plug 210, into the second central bore 242 of the plug 210, and into the second radial bores 250 of the seal retainer 212.

The third radial bores 252 of the seal retainer 212 are spaced about and parallel to the fourth central bore 248. In the illustrated example, the third radial bores 252 extend through the seal retainer 212 in a direction along the longitudinal axis 222 of the valve 200. In the illustrated example, the third central bore 244 of the plug 210 is threaded to mate with the threaded portion 254 of the seal retainer 212 to rigidly secure the seal retainer 212 to the plug 210. The third radial bores 252 of the seal retainer 212 are aligned with corresponding ones of the first radial bores 246 of the plug 210 described above such that pins (not shown) may be commonly received in the third radial bores 252 of the seal retainer 212 and the first radial bores 246 of the plug 210 to further secure the seal retainer 212 to the plug 210. For example, pins passing through the third radial bores 252 of the seal retainer 212 and into the first radial bores 246 of the plug 210 prevent the plug 210 from rotating relative to the seal retainer 212, thereby maintaining the relative positioning of the threaded connection between the plug 210 and the seal retainer 212. As shown in FIGS. 2 and 3, an example seal cavity 256 is formed as a result of the plug 210 being rigidly coupled to the seal retainer 212, and further as a result of the coupled plug 210 and seal retainer 212 being slidably positioned within the seat ring retainer 208 of the valve 200. In some examples, one or more seal(s) (not shown) may reside within the example seal cavity 256.

The seal retainer 212 is rigidly coupled to the stem 214 of the valve 200. More specifically, a portion of the stem 214 is received in the fourth central bore 248 of the seal retainer 212 and rigidly coupled (e.g., via a threaded connection or a suitable fastener) thereto. Thus, the plug 210, the seal retainer 212, and the stem 214 are configured to slide and/or otherwise move as a unit in a direction along the longitudinal axis 222 of the valve 200 between the open configuration of the valve 200 shown in FIG. 2 and the closed configuration of the valve 200 shown in FIG. 3. In some examples, the stem 214 may be operatively coupled to an actuator (e.g. a pneumatic actuator, a hydraulic actuator, an electric actuator, or a manually-operated actuator) that controls movement of the stem 214, the seal retainer 212 and/or the plug 210.

FIGS. 4-7 illustrate the example plug 210 of FIGS. 2 and 3 in greater detail. As shown in FIGS. 4-7, the plug 210 includes an example first section 460 that defines an example first end 462 of the plug 210, an example second section 464 that defines an example second end 466 of the plug 210 opposite the first end 462, and an example third section 468 located between the first and second sections 460, 464. The first, second and third sections 460, 464, 468 define an example longitudinal axis 470 of the plug 210. The longitudinal axis 470 of the plug 210 as shown in FIGS. 4-7 aligns with the longitudinal axis 222 of the valve 200 as shown in FIGS. 2 and 3 and described above. As shown in FIGS. 4-7, each of the first, second and third sections 460, 464, 468 of the plug 210 has a generally circular cross-sectional shape along a plane that is perpendicular to the longitudinal axis 470 of the plug 210. One or more of the first, second and/or third section(s) 460, 464, 468 of the plug 210 may alternatively have other cross-sectional shapes and/or configurations including, for example, shapes resembling an oval, an ellipse, a triangle, a rectangle, a square, a rhombus, a pentagon, a hexagon, an octagon, or any other polygonal shape.

As shown in FIGS. 4-7, the first section 460 of the plug 210 has a generally cylindrical shape. The first section 460 may alternatively take the form of other shapes and/or configurations including, for example, shapes resembling a cylinder, a pyramid, etc. In the illustrated example, the first section 460 defines an example first circumference 472 along an example first plane 473 that is perpendicular to the longitudinal axis 470 of the plug 210.

As shown in FIGS. 4-7, the second section 464 of the plug 210 has a generally conical shape, including an example base portion 474 and an example tip portion 476. The second section 464 may alternatively take the form of other shapes and/or configurations including, for example, shapes resembling a cylinder, a pyramid, etc. In the illustrated example, the base potion 474 of the second section 464 defines an example second circumference 478 along an example second plane 479 that is perpendicular to the longitudinal axis 470 of the plug 210, and the tip portion 476 of the second section 464 defines an example third circumference 480 along an example third plane 481 that is perpendicular to the longitudinal axis 470 of the plug 210.

The third section 468 of the plug 210 includes the example curved notch 232 described above. The curved notch 232 extends entirely around the periphery 234 of the plug 210. In other examples, the curved notch 232 may not extend entirely around the periphery 234 of the plug 210, but may instead extend around and/or occupy only a portion of the periphery 234. Some such examples are described in greater detail below in connection with FIGS. 10-17. As shown in FIGS. 4-7, the curved notch 232 is the only curved notch formed inwardly from and/or occupying the periphery 234 of the plug 210. In other examples, the curved notch 232 may be one of a plurality of curved notches formed inwardly from and/or occupying the periphery 234 of the plug 210. Some such examples are described in greater detail below in connection with FIGS. 14-17. As shown in FIGS. 4-7, the curved notch 232 has an arc-shaped profile in a direction extending along the longitudinal axis 470 of the plug 210. In other examples, the curved notch 232 may have a different profile such as, for example, a parabolic profile, or a profile including an arc and one or more inclined line(s). Some such examples are described in greater detail below in connection with FIGS. 8, 9, 16 and 17.

As shown in FIGS. 4-7, the periphery 234 of the third section 468 of the plug 210 defines a generally cylindrical shape. The periphery 234 of the third section 468 may alternatively take the form of other shapes and/or configurations including, for example, shapes resembling a cylinder, a pyramid, etc. In the illustrated example, the periphery 234 of the third section 468 defines an example fourth circumference 482 along an example fourth plane 483 that is perpendicular to the longitudinal axis 470 of the plug 210. In the illustrated example, the curved notch 232 of the third section 468 defines an example fifth circumference 484 along an example fifth plane 485 that is perpendicular to the longitudinal axis 470 of the plug 210.

As shown in FIGS. 4-7, the first circumference 472 defined by the first section 460 of the plug 210 is less than the second circumference 478 defined by the base portion 474 of the second section 464 of the plug 210, is greater than the third circumference 480 defined by the tip portion 476 of the second section 464 of the plug 210, is less than the fourth circumference 482 defined by the periphery 234 of the third section 468 of the plug 210, and is approximately equal to the fifth circumference 484 defined by the curved notch 232 of the third section 468 of the plug 210. In the illustrated example, the second circumference 478 defined by the base portion 474 of the second section 464 of the plug 210 is greater than the third circumference 480 defined by the tip portion 476 of the second section 464 of the plug 210, is approximately equal to the fourth circumference 482 defined by the periphery 234 of the third section 468 of the plug 210, and is greater than the fifth circumference 484 defined by the curved notch 232 of the third section 468 of the plug 210. In the illustrated example, the third circumference 480 defined by the tip portion 476 of the second section 464 of the plug 210 is less than the fourth circumference 482 defined by the periphery 234 of the third section 468 of the plug 210, and is less than the fifth circumference 484 defined by the curved notch 232 of the third section 468 of the plug 210. In the illustrated example, the fourth circumference 482 defined by the periphery 234 of the third section 468 of the plug 210 is greater than the fifth circumference 484 defined by the curved notch 232 of the third section 468 of the plug 210. In other examples, the above-described spatial relationships between the first, second, third fourth and fifth circumferences 472, 478, 480, 482, 484 may differ, so long as the curved notch 232 is formed inwardly from the periphery 234 of the third section 468 of the plug and/or, more generally, formed inwardly from a periphery of the plug 210.

Figure 8:
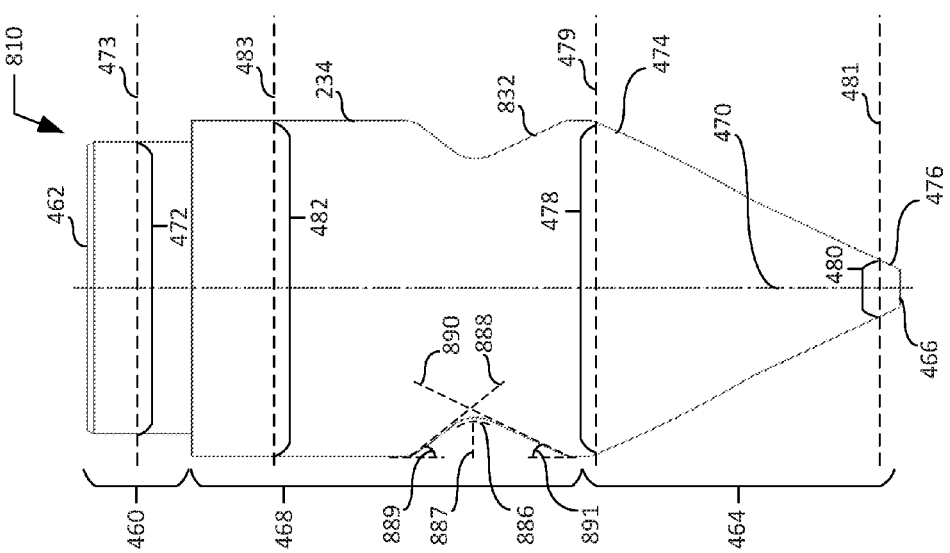
FIG. 8 is a side view of a second example valve plug having a second example curved notch.

FIG. 8 is a side view of a second example valve plug 810 having a second example curved notch 832. In the illustrated example, the plug 810 of FIG. 8 includes the same periphery 234, first, second and third sections 460, 464, 468, first and second ends 462, 466, longitudinal axis 470, base portion 474, tip portion 476, and first, second, third and fourth circumferences 472, 478, 480, 482 as the example plug 210 of FIGS. 2-7 described above. Like the example curved notch 232 of the example plug 210 of FIGS. 2-7 described above, the curved notch 832 of the plug 810 of FIG. 8 extends entirely around the periphery 234 of the third section 468 of the plug 810. However, in contrast to the example arc-shaped curved notch 232 of the example plug 210 of FIGS. 2-7 described above, the curved notch 832 formed inwardly from the periphery 234 of the third section 468 of the plug 810 of FIG. 8 has a profile defined by the combination of an example arc 886, an example first inclined line 888 and an example second inclined line 890.

In the illustrated example of FIG. 8, the arc 886 is curved inwardly from the periphery 234 of the third section 468 of the plug 810. The arc 886 has an example radius of curvature 887. In other examples, the radius of curvature 887 of the arc 886 may be greater than or less than the radius of curvature 887 shown in the example of FIG. 8. In the illustrated example of FIG. 8, the first inclined line 888 is inclined at an example first angle 889 inwardly from the periphery 234 of the third section 468 of the plug 810, and the second inclined line 890 is inclined at an example second angle 891 inwardly from the periphery 234 of the third section 468 of the plug 810. In the illustrated example, the first and second angles 889, 891 differ from one another. In the illustrated example, the first angle 889 is greater than the second angle 891. In other examples, the first and second angles 889, 891 may be the same. In other examples, one or both of the first and/or second inclined lines 888, 890 may be inclined at an angle that differs from the first and/or second angles 889, 891 shown in the example of FIG. 8.

Figure 9:
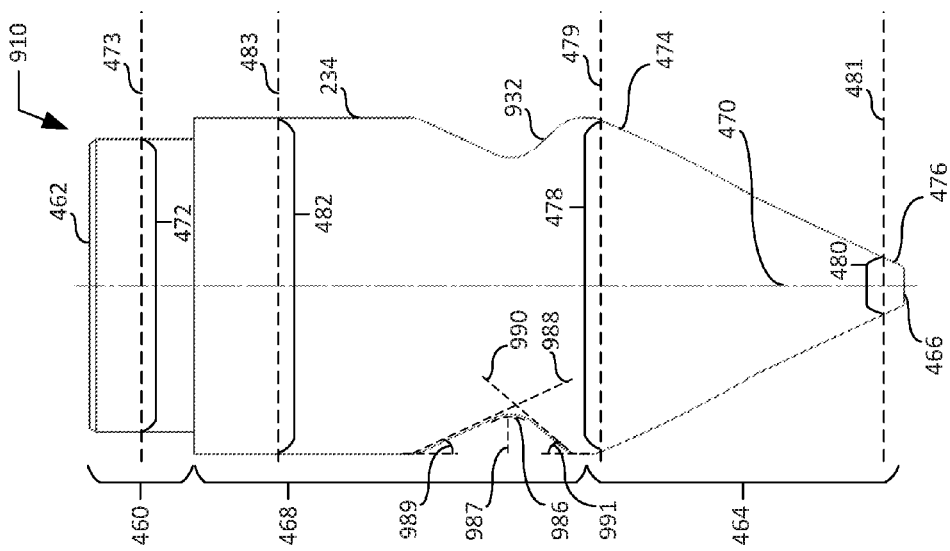
FIG. 9 is a side view of a third example valve plug having a third example curved notch.

FIG. 9 is a side view of a third example valve plug 910 having a third example curved notch 932. In the illustrated example, the plug 910 of FIG. 9 includes the same periphery 234, first, second and third sections 460, 464, 468, first and second ends 462, 466, longitudinal axis 470, base portion 474, tip portion 476, and first, second, third and fourth circumferences 472, 478, 480, 482 as the example plug 210 of FIGS. 2-7 described above. Like the example curved notch 232 of the example plug 210 of FIGS. 2-7 described above, the curved notch 932 of the plug 910 of FIG. 9 extends entirely around the periphery 234 of the third section 468 of the plug 910. However, in contrast to the example arc-shaped curved notch 232 of the example plug 210 of FIGS. 2-7 described above, the curved notch 932 formed inwardly from the periphery 234 of the third section 468 of the plug 910 of FIG. 9 has a profile defined by the combination of an example arc 986, an example first inclined line 988 and an example second inclined line 990.

In the illustrated example of FIG. 9, the arc 986 is curved inwardly from the periphery 234 of the third section 468 of the plug 910. The arc 986 has an example radius of curvature 987. In other examples, the radius of curvature 987 of the arc 986 may be greater than or less than the radius of curvature 987 shown in the example of FIG. 9. In the illustrated example of FIG. 9, the first inclined line 988 is inclined at an example first angle 989 inwardly from the periphery 234 of the third section 468 of the plug 910, and the second inclined line 990 is inclined at an example second angle 991 inwardly from the periphery 234 of the third section 468 of the plug 910. In the illustrated example, the first and second angles 989, 991 differ from one another. In the illustrated example, the first angle 989 is less than the second angle 991. In other examples, the first and second angles 989, 991 may be the same. In other examples, one or both of the first and/or second inclined lines 988, 990 may be inclined at an angle that differs from the first and/or second angles 989, 991 shown in the example of FIG. 9.

Figure 10:
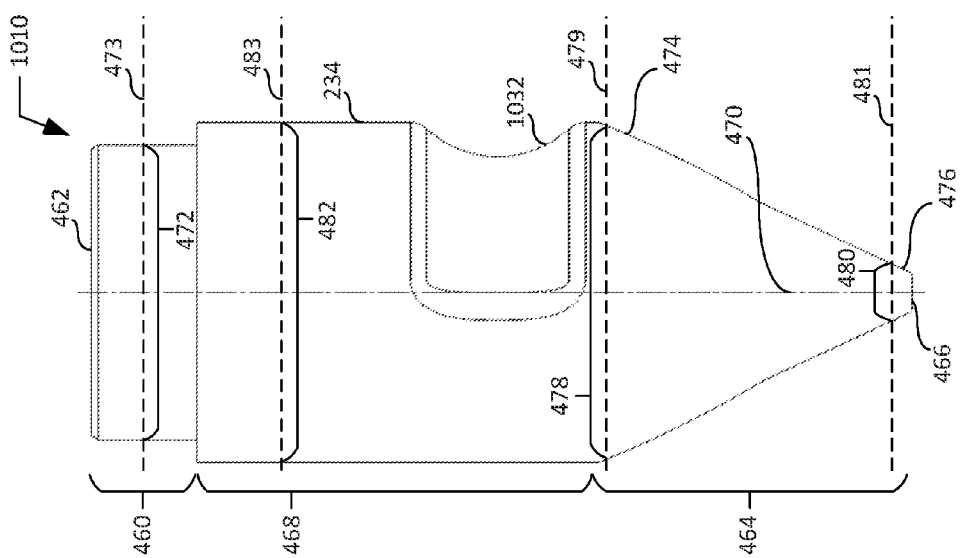
FIG. 10 is a side view of a fourth example valve plug having a fourth example curved notch.
Figure 11:
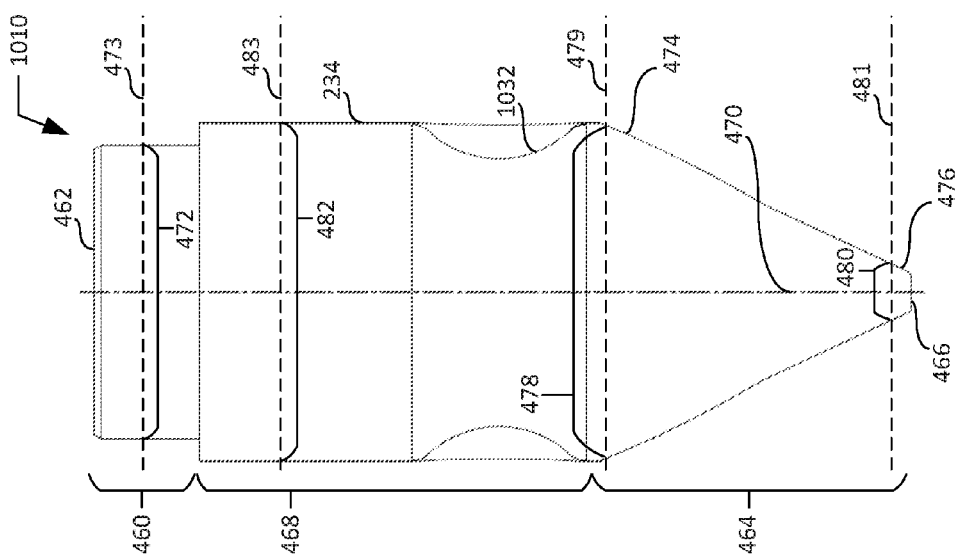
FIG. 11 is another side view of the fourth example valve plug of FIG. 10, rotated approximately ninety degrees relative to the side view of FIG. 10.

FIG. 10 is a side view of a fourth example valve plug 1010 having a fourth example curved notch 1032. FIG. 11 is another side view of the fourth example valve plug 1010 of FIG. 10, rotated approximately ninety degrees relative to the side view of FIG. 10. In the illustrated example of FIGS. 10 and 11, the plug 1010 includes the same periphery 234, first, second and third sections 460, 464, 468, first and second ends 462, 466, longitudinal axis 470, base portion 474, tip portion 476, and first, second, third and fourth circumferences 472, 478, 480, 482 as of the example plug 210 of FIGS. 2-7 described above. However, in contrast to the example curved notch 232 of the example plug 210 of FIGS. 2-7 described above that extends entirely around the periphery 234 of the third section 468 of the plug 210, the curved notch 1032 formed inwardly from the periphery 234 of the third section 468 of the plug 1010 of FIGS. 10 and 11 only extends around a portion of the periphery 234.

In the illustrated example of FIGS. 10 and 11, the curved notch 1032 formed inwardly from the periphery 234 of the third section 468 of the plug 1010 extends around approximately half of the periphery 234. In other examples, the curved notch 1032 formed inwardly from the periphery 234 of the third section 468 of the plug 1010 may extend around a portion of the periphery 234 that is greater than or less than that shown in the example of FIGS. 10 and 11. When positioned within the example valve 200 of FIGS. 2 and 3, the plug 1010 of FIGS. 10 and 11 is oriented such that the curved notch 1032 faces toward the example enlarged cavity 236 of FIGS. 2 and 3 described above.

Figure 13:
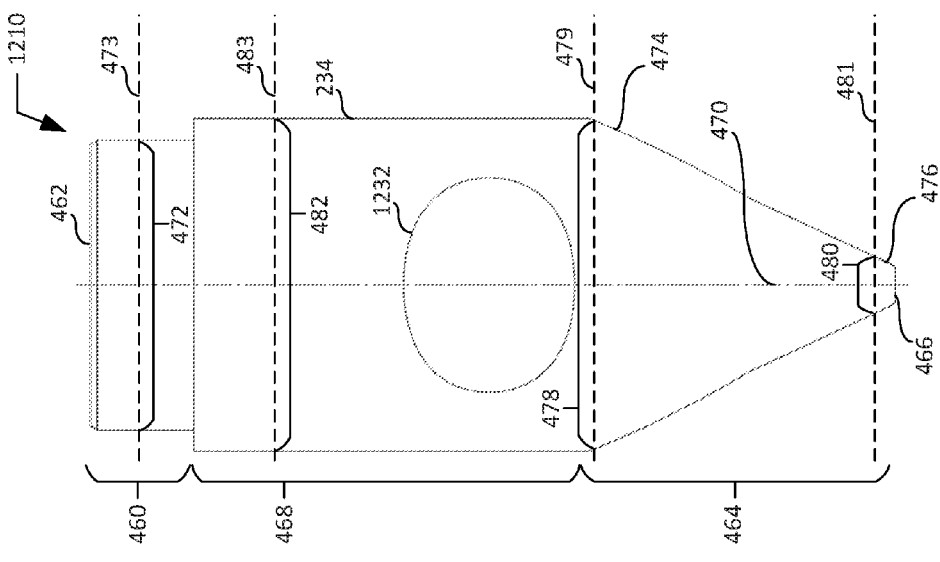
FIG. 13 is another side view of the fifth example valve plug of FIG. 12, rotated approximately ninety degrees relative to the side view of FIG. 12.
Figure 12:
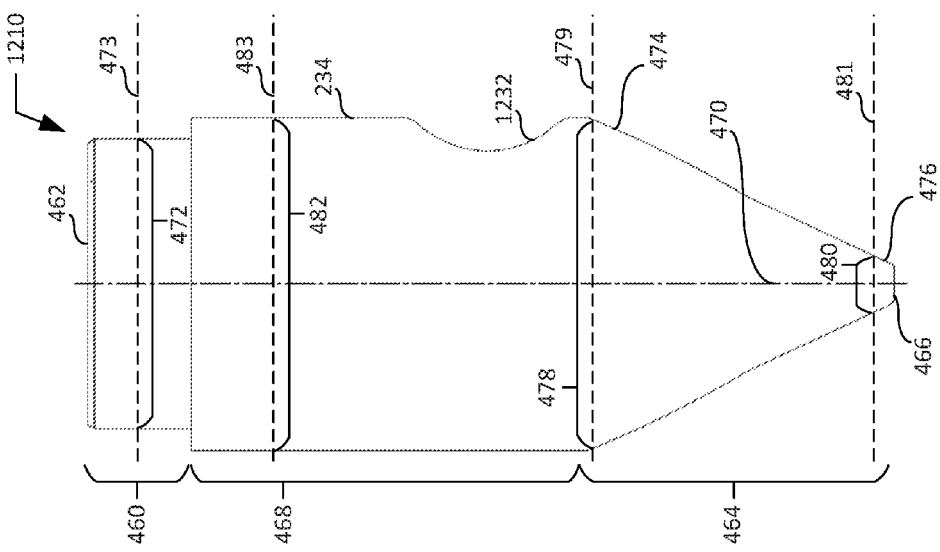
FIG. 12 is a side view of a fifth example valve plug having a fifth example curved notch.

FIG. 12 is a side view of a fifth example valve plug 1210 having a fifth example curved notch 1232. FIG. 13 is another side view of the fifth example valve plug 1210 of FIG. 12, rotated approximately ninety degrees relative to the side view of FIG. 12. In the illustrated example of FIGS. 12 and 13, the plug 1210 includes the same periphery 234, first, second and third sections 460, 464, 468, first and second ends 462, 466, longitudinal axis 470, base portion 474, tip portion 476, and first, second, third and fourth circumferences 472, 478, 480, 482 as of the example plug 210 of FIGS. 2-7 described above. However, in contrast to the example curved notch 232 of the example plug 210 of FIGS. 2-7 described above that extends entirely around the periphery 234 of the third section 468 of the plug 210, the curved notch 1232 formed inwardly from the periphery 234 of the third section 468 of the plug 1210 of FIGS. 12 and 13 only extends around a portion of the periphery 234.

In the illustrated example of FIGS. 12 and 13, the curved notch 1232 formed inwardly from the periphery 234 of the third section 468 of the plug 1210 extends around approximately one quarter and/or one fourth of the periphery 234. In other examples, the curved notch 1232 formed inwardly from the periphery 234 of the third section 468 of the plug 1210 may extend around a portion of the periphery 234 that is greater than or less than that shown in the example of FIGS. 12 and 13. When positioned within the example valve 200 of FIGS. 2 and 3, the plug 1210 of FIGS. 12 and 13 is oriented such that the curved notch 1232 faces toward the example enlarged cavity 236 of FIGS. 2 and 3 described above.

FIG. 14 is a side view of a sixth example valve plug 1410 having seventh and eighth example curved notches 1432, 1492. FIG. 15 is another side view of the sixth example valve plug 1410 of FIG. 14, rotated approximately ninety degrees relative to the side view of FIG. 14. In the illustrated example of FIGS. 14 and 15, the plug 1410 includes the same periphery 234, first, second and third sections 460, 464, 468, first and second ends 462, 466, longitudinal axis 470, base portion 474, tip portion 476, and first, second, third and fourth circumferences 472, 478, 480, 482 as of the example plug 210 of FIGS. 2-7 described above. However, in contrast to the example curved notch 232 of the example plug 210 of FIGS. 2-7 described above that is the only curved notch formed inwardly from the periphery 234 of the plug 210, the plug 1410 of FIGS. 14 and 15 includes an example first curved notch 1432 and an example second curved notch 1492 formed inwardly from the periphery 234 of the third section 468 of the plug 1410. In other examples, the plug 1410 may include curved notches formed inwardly from the periphery 234 of the third section 468 of the plug 1410 in addition to the first and second curved notches 1432, 1492 shown in the example of FIGS. 14 and 15.

In the illustrated example of FIGS. 14 and 15, both of the first and second curved notches 1432, 1492 have arc-shaped profiles in a direction extending along the longitudinal axis 470 of the plug 1410. In the illustrated example, the arc-shaped profile of each of the first and second curved notches 1432, 1492 is the same. In other examples, the profiles and/or shapes of the first and second curved notches 1432, 1492 may differ from one another, and/or may differ from the profiles and/or shapes shown in the example of FIGS. 14 and 15. In the illustrated example, the first and second curved notches 1432, 1492 are equally spaced apart from one another around the periphery 234 of the plug 1410 such that the first and second curved notches 1432, 1492 are oriented opposite one another on the plug 1410. In other examples, the relative spacing between the first and second curved notches 1432, 1492 may differ from that shown in the example of FIGS. 14 and 15. When positioned within the example valve 200 of FIGS. 2 and 3, the plug 1468 of FIGS. 14 and 15 is oriented such that the first curved notch 1432 faces toward the example enlarged cavity 236 of FIGS. 2 and 3 described above, while the second curved notch 1492 faces away from the enlarged cavity 236.

Figure 17:
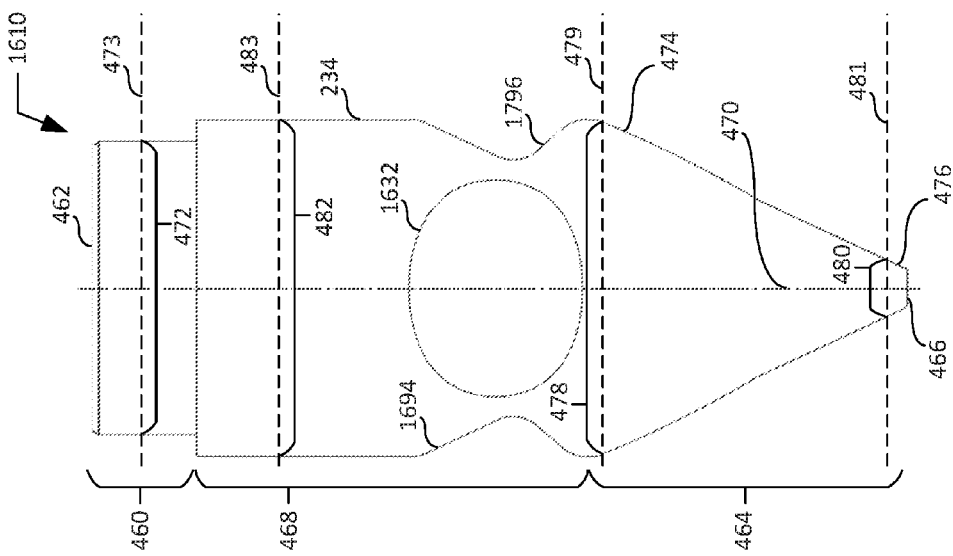
FIG. 17 is another side view of the seventh example valve plug of FIG. 16, rotated approximately ninety degrees relative to the side view of FIG. 16.
Figure 16:
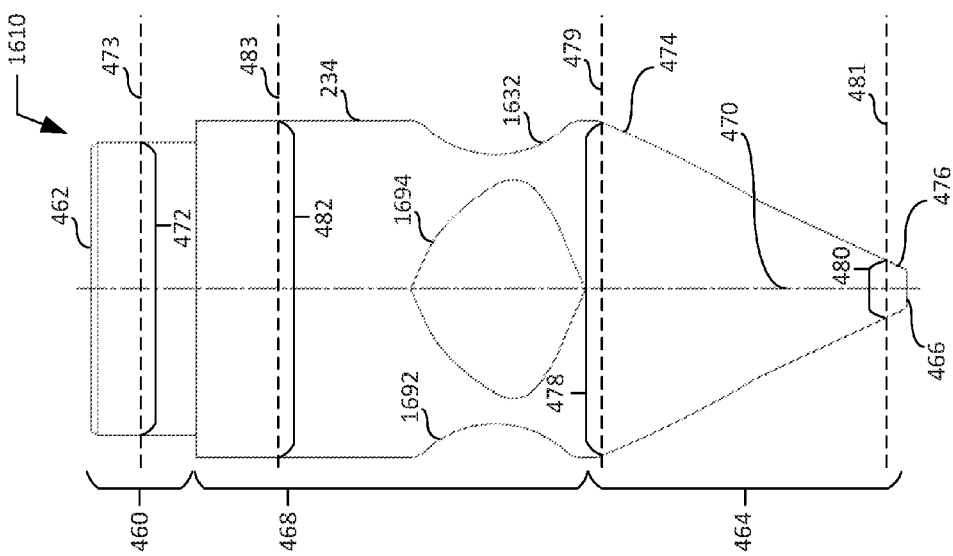
FIG. 16 is a side view of a seventh example valve plug having ninth, tenth, eleventh and twelfth example curved notches.

FIG. 16 is a side view of a seventh example valve plug 1610 having ninth, tenth, eleventh and twelfth example curved notches 1632, 1692, 1694, 1796. FIG. 17 is another side view of the seventh example valve plug 1610 of FIG. 16, rotated approximately ninety degrees relative to the side view of FIG. 16. In the illustrated example of FIGS. 16 and 17, the plug 1610 includes the same periphery 234, first, second and third sections 460, 464, 468, first and second ends 462, 466, longitudinal axis 470, base portion 474, tip portion 476, and first, second, third and fourth circumferences 472, 478, 480, 482 as of the example plug 210 of FIGS. 2-7 described above. However, in contrast to the example curved notch 232 of the example plug 210 of FIGS. 2-7 described above that is the only curved notch formed inwardly from the periphery 234 of the plug 210, the plug 1610 of FIGS. 16 and 17 includes the example first curved notch 1632, the example second curved notch 1692, the example third curved notch 1694 and the example fourth curved notch 1796 formed inwardly from the periphery 234 of the third section 468 of the plug 1610. In other examples, the plug 1610 may include curved notches formed inwardly from the periphery 234 of the third section 468 of the plug 1610 in addition to the first, second, third and fourth curved notches 1632, 1692, 1694, 1796 shown in the example of FIGS. 16 and 17.

In the illustrated example of FIGS. 16 and 17, the first and second curved notches 1632, 1692 have arc-shaped profiles in a direction extending along the longitudinal axis 470 of the plug 1610, while the third and fourth curved notches 1694, 1796 have profiles in a direction extending along the longitudinal axis 470 of the plug 1610 that include an arc and one or more inclined line(s) (e.g., similar to the example profile of the curved notch 832 of the plug 810 of FIG. 8 or the example profile of the curved notch 932 of the plug 910 of FIG. 9, as described above). In the illustrated example, the arc-shaped profiles of the first and second curved notches 1632, 1692 are the same as one another, while the alternate profiles of the third and fourth curved notches 1694, 1796 are the same as one another, but different from the arc-shaped profiles of the first and second curved notches 1632, 1692. In other examples, the profiles and/or shapes of each of the first, second, third and fourth curved notches 1632, 1692, 1694, 1796 may differ from one another, and/or may differ from the profiles and/or shapes shown in the example of FIGS. 16 and 17. In the illustrated example, the first, second, third and fourth curved notches 1632, 1692, 1694, 1796 are equally spaced apart from one another around the periphery 234 of the plug 1610 such that the first and second curved notches 1632, 1692 are oriented opposite one another on the plug 1610 and the third and fourth curved notches 1694, 1796 are oriented opposite one another on the plug 1610. In other examples, the relative spacing between the first, second, third and fourth curved notches 1632, 1692, 1694, 1796 may differ from that shown the example of FIGS. 16 and 17. When positioned within the example valve 200 of FIGS. 2 and 3, the plug 1610 of FIGS. 16 and 17 is oriented such that the first curved notch 1632 faces toward the example enlarged cavity 236 of FIGS. 2 and 3 described above, while the second curved notch 1692 faces away from the enlarged cavity 236.

Although certain apparatus have been described herein, the scope of coverage of this patent is not limited thereto. On the contrary, this patent covers all apparatus fairly falling within the scope of the appended claims either literally or under the doctrine of equivalents.

What is claimed is:

1. An apparatus, comprising:
a valve body having an inlet and an outlet;
a seat ring positioned within the outlet;
a seat ring retainer positioned within the valve body, the seat ring retainer to retain the seat ring within the outlet, the seat ring retainer having at least one aperture, the at least one aperture to enable a fluid to flow from the inlet through the seat ring retainer, through the seat ring, and toward the outlet; and
a valve plug positioned within the seat ring retainer and slidable between an open position and a closed position relative to the seat ring, the valve plug including:
a first section defining a first end;
a second section defining a second end opposite the first end, the second section to contact the seat ring when the valve plug is in the closed position; and
a third section located between the first and second sections, the third section including a curved notch formed inwardly from a periphery of the third section toward a longitudinal axis of the valve plug defined by the first, second and third sections, the curved notch having an arc-shaped profile in a plane parallel to the longitudinal axis, the arc-shaped profile of the curved notch having a longitudinal span along the longitudinal axis, the longitudinal span of the arc-shaped profile being located outside of and not overlapping a longitudinal span of the seat ring when the valve plug is in the open position, the longitudinal span of the arc-shaped profile being located within the longitudinal span of the seat ring when the valve plug is in the closed position.

2. The apparatus as defined in claim 1, wherein the curved notch extends completely about the periphery of the third section.

3. The apparatus as defined in claim 1, wherein the arc-shaped profile is to provide for a sonic flow of a fluid proximate a backside inner wall surface of the valve body.

4. The apparatus as defined in claim 1, wherein the first section has a cylindrical shape along the longitudinal axis, the second section has a conical shape along the longitudinal axis, and the periphery of the third section has a cylindrical shape along the longitudinal axis, the conical shape of the second section including a base portion located adjacent the third section and a tip portion located opposite the base portion.

5. The apparatus as defined in claim 4, further including a first circumference defined by the first section, a second circumference defined by the base portion of the second section, a third circumference defined by the tip portion of the second section, a fourth circumference defined by the periphery of the third section, and a fifth circumference defined in part by the curved notch.

6. The apparatus as defined in claim 5, wherein the first circumference is less than the second circumference.

7. The apparatus as defined in claim 5, wherein the first circumference is less than the fourth circumference.

8. The apparatus as defined in claim 5, wherein the second circumference is greater than the third circumference and approximately equal to the fourth circumference.

9. The apparatus as defined in claim 5, wherein the fifth circumference is less than the fourth circumference and greater than the third circumference.

10. The apparatus as defined in claim 1, wherein the curved notch extends about only a portion of the periphery of the third section.

11. The apparatus as defined in claim 10, wherein the curved notch is a first curved notch and the arc-shaped profile is a first profile, and wherein the valve plug further comprises a second curved notch formed inwardly from the periphery of the third section toward the longitudinal axis, the second notch having a second profile in the plane parallel to the longitudinal axis, the first and second curved notches being spaced apart from one another about the periphery of the third section.

12. The apparatus as defined in claim 11, wherein the first and second profiles are shaped differently relative to one another.

13. The apparatus as defined in claim 12, wherein the second profile is formed by an inclined line and an arc, the inclined line being formed inwardly from the periphery of the third section toward the longitudinal axis, the arc being curved inwardly from the periphery of the third section toward the longitudinal axis.

14. An apparatus, comprising:
a valve body having an inlet and an outlet;
a seat ring positioned within the outlet;
a seat ring retainer positioned within the valve body, the seat ring retainer to retain the seat ring within the outlet, the seat ring retainer having at least one aperture, the at least one aperture to enable a fluid to flow from the inlet through the seat ring retainer, through the seat ring, and toward the outlet; and
a valve plug positioned within the seat ring retainer and slidable between an open position and a closed position relative to the seat ring, the valve plug including:
a first section defining a first end, the first section having a cylindrical shape;
a second section defining a second end opposite the first end, the second section having a conical shape, the second section to contact the seat ring when the valve plug is in the closed position; and
a third section located between the first and second sections, the third section including a curved notch formed inwardly from a periphery of the third section toward a longitudinal axis of the valve plug defined by the first, second and third sections, the periphery of the third section having a cylindrical shape, the curved notch having an arc-shaped profile in a plane parallel to the longitudinal axis, the conical shape of the second section including a base portion located adjacent the third section and a tip portion located opposite the base portion, the arc-shaped profile of the curved notch having a longitudinal span along the longitudinal axis, the longitudinal span of the arc-shaped profile being located outside of and not overlapping a longitudinal span of the seat ring when the valve plug is in the open position, the longitudinal span of the arc-shaped profile being located within the longitudinal span of the seat ring when the valve plug is in the closed position.

15. The apparatus as defined in claim 14, wherein the curved notch extends completely about the periphery of the third section.

16. The apparatus as defined in claim 14, wherein the arc-shaped profile is to provide for a sonic flow of a fluid proximate a backside inner wall surface of the valve body.

17. The apparatus as defined in claim 14, wherein the curved notch extends about only a portion of the periphery of the third section.

18. The apparatus as defined in claim 17, wherein the curved notch is a first curved notch and the arc-shaped profile is a first profile, and wherein the valve plug further comprises a second curved notch formed inwardly from the periphery of the third section toward the longitudinal axis, the second notch having a second profile in the plane parallel to the longitudinal axis, the first and second curved notches being spaced apart from one another about the periphery of the third section.

19. The apparatus as defined in claim 18, wherein the first and second profiles are shaped differently relative to one another.

20. An apparatus, comprising:
a valve body having an inlet and an outlet positioned orthogonally relative to the inlet;
a seat ring positioned within the outlet;
a seat ring retainer positioned within the valve body, the seat ring retainer to retain the seat ring within the outlet, the seat ring retainer having at least one aperture, the at least one aperture to enable a fluid to flow from the inlet through the seat ring retainer, through the seat ring, and toward the outlet; and
a valve plug positioned within the seat ring retainer and slidable between an open position and a closed position relative to the seat ring, the valve plug including:
a first section defining a first end, the first section having a cylindrical shape;

a second section defining a second end opposite the first end, the second section having a conical shape, the second section to contact the seat ring when the valve plug is in the closed position; and a third section located between the first and second sections, the third section including a curved notch formed inwardly from a periphery of the third section toward a longitudinal axis of the valve plug defined by the first, second and third sections, the periphery of the third section having a cylindrical shape, the curved notch having a curved profile in a plane parallel to the longitudinal axis, the conical shape of the second section including a base portion located adjacent the third section and a tip portion located opposite the base portion, the curved profile of the curved notch having a longitudinal span along the longitudinal axis, the longitudinal span of the curved profile being located outside of and not overlapping a longitudinal span of the seat ring when the valve plug is in the open position, the longitudinal span of the curved profile being located within the longitudinal span of the seat ring when the valve plug is in the closed position.

21. The apparatus as defined in claim 20, wherein the curved notch is to increase a flow rate associated with the fluid between a backside inner wall surface of the valve body and the third section of the valve plug.

22. The apparatus as defined in claim 20, wherein the curved profile is an arc-shaped profile, the arc-shaped profile to provide for a sonic flow of a fluid proximate a backside inner wall surface of the valve body.

\* \* \* \* \*